Figure 1:
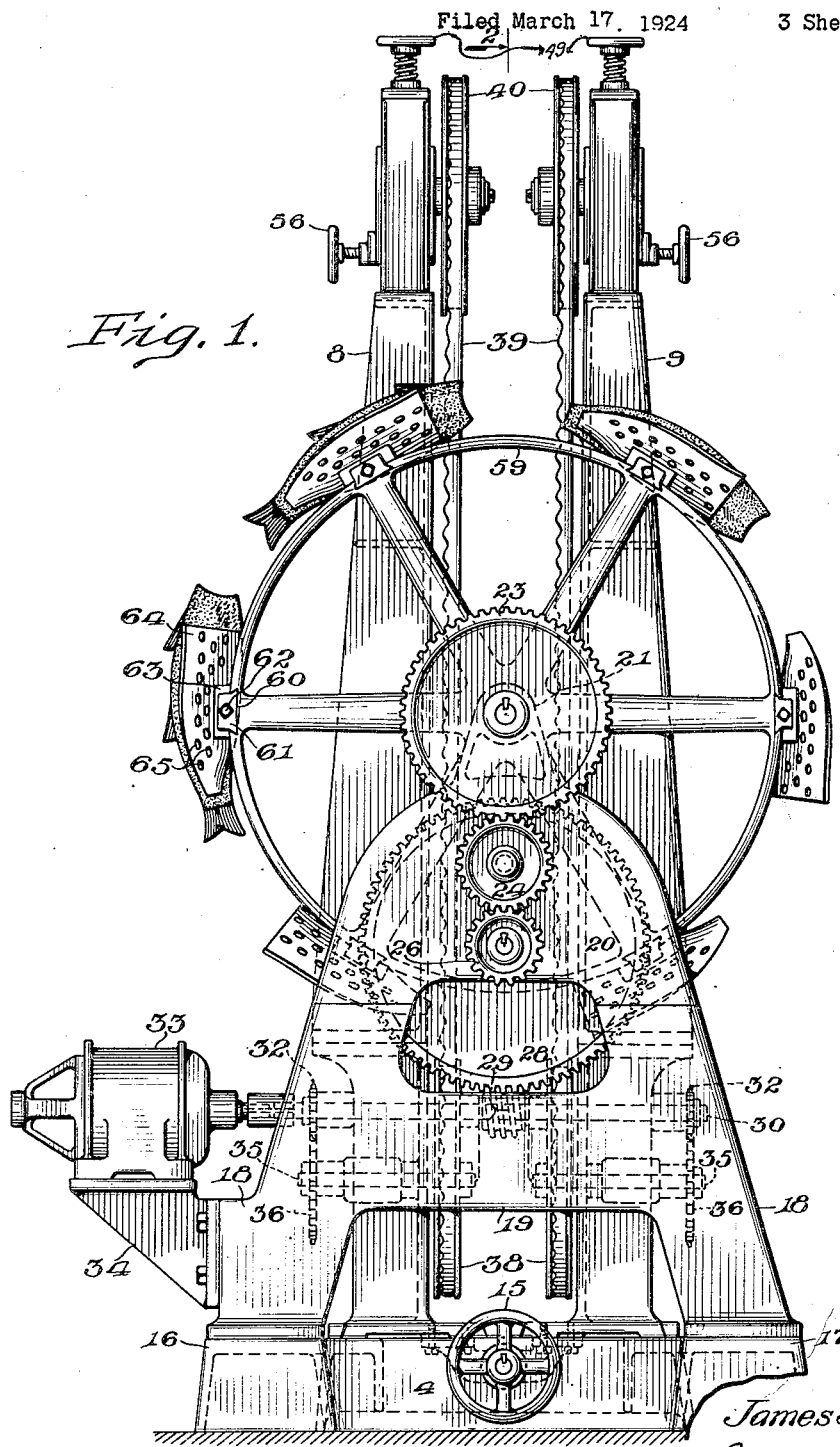

Sept. 8, 1925.  1,552,463
J. J. BARRY
FILLETING MACHINE
Filed March 17, 1924   3 Sheets-Sheet 1

WITNESS
F. J. Hartman

INVENTOR
James J. Barry,
BY
J. Stuart Freeman,
ATTORNEY

Sept. 8, 1925.  
J. J. BARRY  
FILLETING MACHINE  
Filed March 17, 1924  
1,552,463  
3 Sheets-Sheet 2
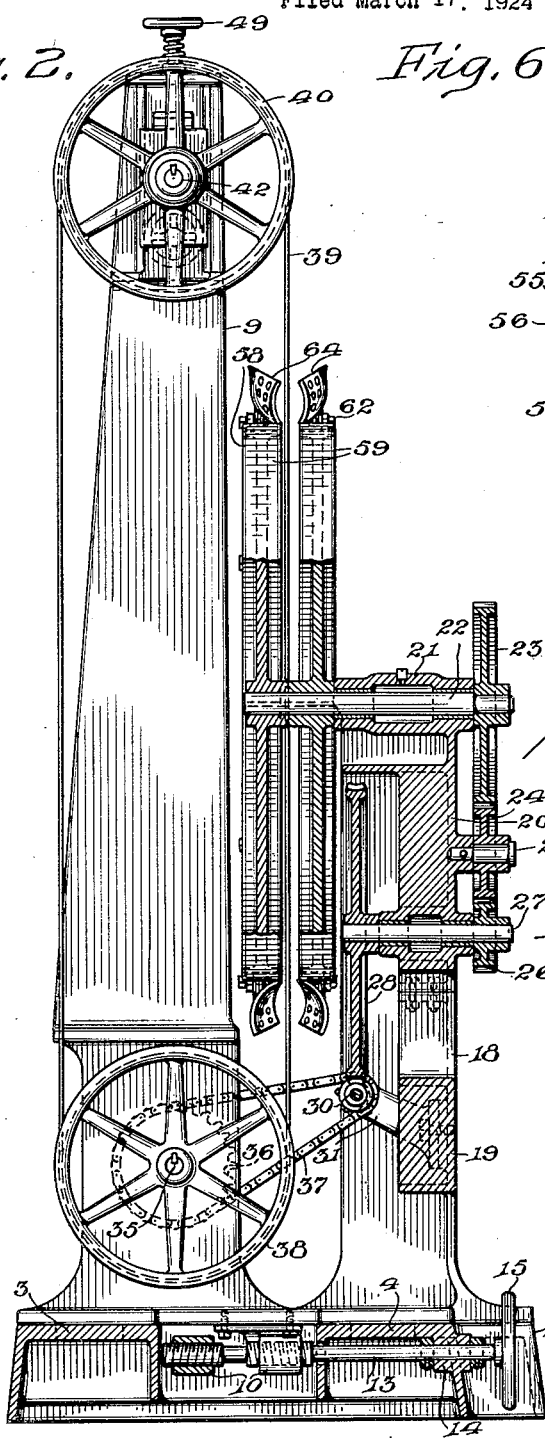

Sept. 8, 1925.  
J. J. BARRY  
FILLETING MACHINE  
Filed March 17, 1924  
1,552,463  
3 Sheets-Sheet 3
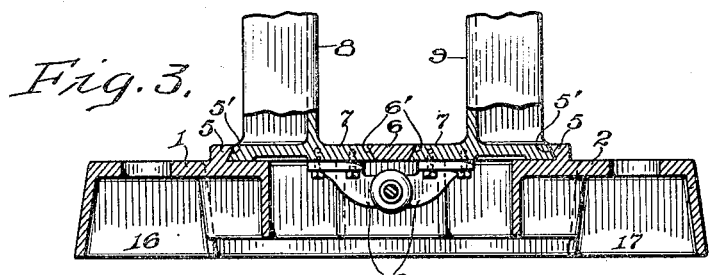
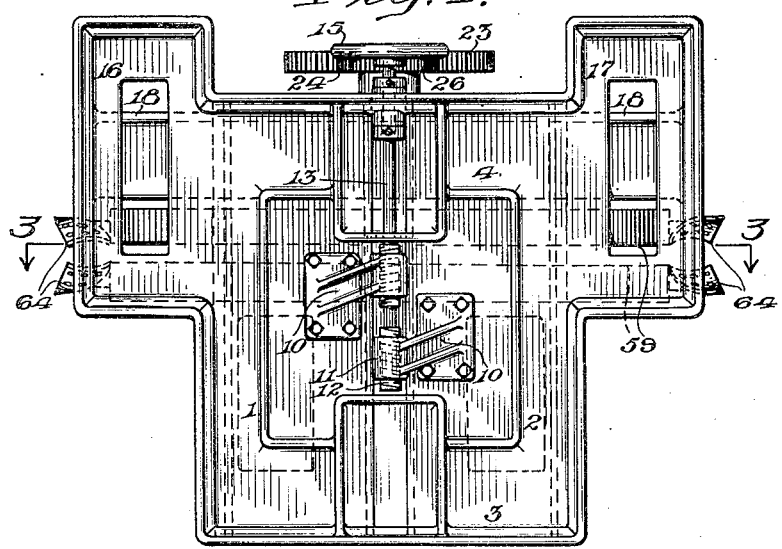
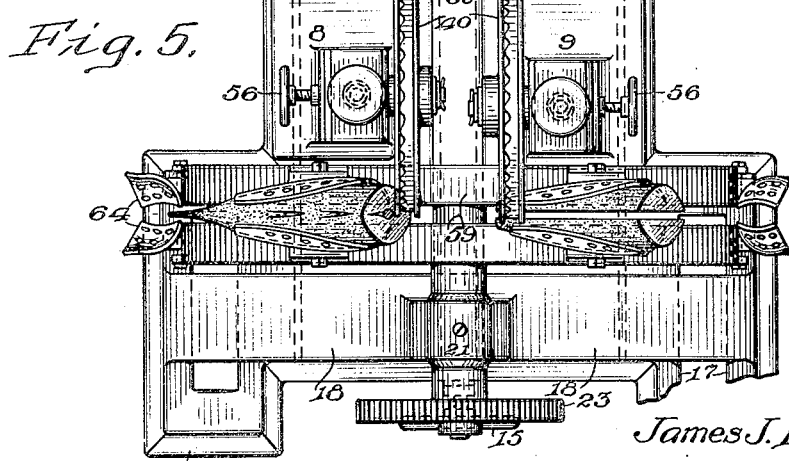
INVENTOR  
James J. Barry,  
BY  
J. Stuart Freeman,  
ATTORNEY
WITNESS  
F. J. Hartman.

Patented Sept. 8, 1925.

1,552,463

UNITED STATES PATENT OFFICE.

JAMES J. BARRY, OF NEW YORK, N. Y., ASSIGNOR OF ONE-HALF TO WILLIAM T. GAMAGE, OF GLOUCESTER, MASSACHUSETTS.

FILLETING MACHINE.

Application filed March 17, 1924. Serial No. 699,731.

*To all whom it may concern:*

Be it known that I, JAMES J. BARRY, a citizen of the United States, residing at New York, in the county of New York and State of New York, have invented certain new and useful Improvements in Filleting Machines, of which the following is a specification.

The object of this invention is to provide numerous improvements in machinery for the handling of fish, and particularly for cutting fish into fillets and separating the principal bone, known as the back-bone, therefrom.

In preparing dressed fish in large quantities, it is of course desirable to dispose of them as economically as possible, that is the largest number in a given time, with the least possible amount of individual handling, and to produce a clean-cut removal of the so-called back-bone with a minimum of waste meat.

An object of the invention therefore is to provide a rotary member, means carried by said member to operatively support fish and to move fish in a given path, and a pair of cutting members movable in proximity to said first member and operative to cut the fish in such manner as to separate a central portion, containing the back and many other bones, the tail and fins, from the laterally oppositely disposed side portions, which in most fish is composed principally of meat with relatively little further waste.

Another object is to provide in such a device a rotary member comprising a pair of spaced coaxial wheels movable in unison and each adapted to support one of the lateral members which co-operate to form a basket or receptacle tapering towards one end, and the sides at their wider ends being preferably divergent outwardly, while at their narrower ends said sides, though spaced apart, are concaved and converging, so as to permit receptacles of a given size and shape to accommodate many different sizes of fish.

A further object of the invention is to provide cutting members in the form of endless blades, preferably having a wavy cutting edge, sharpened or bevelled upon one side only and lying in the plane of the other side of the blade, said members rotating over suitable pulleys or drums, said members being spaced one to the rear of the other and preferably separated upon opposite sides of the shaft upon which the fish-supporting wheels are carried.

Still another object is to provide in such a machine a base, a pair of standards or frames respectively adapted to carry the pulleys which support said cutting members, and means preferably mounted upon the said base and co-operating with each of said frames, so that actuation of said means effects a relative movement of said frames, whereby the paths of movement of said cutting members are shifted towards or away from alignment with a common plane, depending upon the thickness of the back-bones of the type of fish being handled, as the blades are intended to bear against, and thereby cut the fish closely upon the opposite sides of said back-bones, as will be hereinafter described.

And a still further object is to provide in such a device means for rotating the fish-supporting wheels at any desired speed, and to drive the supporting drums or pulleys carrying the cutting members at a speed having a predetermined relation to the speed of said wheels, together with means for tensioning the said cutting members independently of each other, and means for canting the said supporting drums, whereby a nicely adjusted tension of each cutting member and of their relations with each other, permits them to enter a fish while within its supporting receptacle in planes closer together than the transverse thickness of the back-bone; then as they successively engage the sides of said bone they are deflected so as to pass by and around the same, and thereafter to close together towards their predetermined planes of movement, for the purpose of minimizing the quantity of fish meat cut with the back-bone from the remainder of the body.

With these and other objects in view, the present invention comprises additional novel details of construction and operation hereinafter fully brought out in the following description, when read in conjunction with the accompanying drawings, in which Fig. 1 is a front elevation of one embodiment of the invention; Fig. 2 is a vertical section on the line 2—2 of Fig. 1; Fig. 3 is a section on the line 3—3 of Fig. 4; Fig. 4 is a bottom plan view of the device; Fig. 5 is a top plan view of the device; Fig. 6 is an enlarged fragmentary sectional view of the supporting means for one of the upper pulleys over which the flexible band-knives pass; Fig. 7 is a schematic view illustrating the method by which the band-knives cut and remove the central bone-containing portion of a fish from the sides of the latter; and Fig. 8 is an enlarged fragmentary view of one of said band-knives.

Referring to the drawings, a hollow base member is provided, having a table portion comprising oppositely positioned parallel sections 1 and 2, connected at their forward and rear portions by transversely extending sections 3 and 4, said first-named sections being provided with upwardly extending flanges 5, which have downwardly diverging adjacent faces 5'. Extending between the sections 3 and 4 is an integrally supported centrally disposed section 6, having oppositely positioned, downwardly converging surfaces 6', which co-operate with the said surfaces 5' to form a pair of guides, wherein move the base portions 7 of upwardly extending frames 8 and 9, hereinafter described. To the under surface of each of the bases 7 is secured a downwardly and inwardly extending bracket 10, having heads 11, which are in permanent alignment with each other and are drilled and tapped with respectively right- and left-hand threads for the combination of correspondingly threaded portions 12 of a shaft 13, which is supported at its inner end by said brackets, and at its opposite end is journalled through a bearing 14 formed in the forward portion of the base section 4, and is provided upon its outer extremity with a suitable hand-actuating wheel 15, whereby rotation of said wheel in the shaft 13 operates to move the frames 8 and 9 either towards or away from each other along the respective grooves hereinbefore defined, and for a purpose hereinafter described.

The base of the machine is extended at its forward portion in laterally opposite directions to form wing sections 16 and 17, secured to and upon which are supported the legs 18 of an A frame, having a transversely extending reinforcing section 19, and an uppermost centrally disposed head 20, upon which latter is superimposed an extension 21, through which is journalled a shaft 22. The outer end of this shaft has keyed thereto a gear-wheel 23, which meshes with an idler-pinion 24 rotatably mounted upon a stud 25 supported by the uper section 20 of the A frame, said idler in turn meshing with a pinion 26 keyed to a counter-shaft 27, which is also journalled through the frame section 20, and is provided upon its oppositely extending end with a worm-gear 28, which meshes with the worm 29, carried centrally upon a shaft 30, which is supported by spaced brackets 31 carried in turn by the reinforcing section 19 of the A frame. Said shaft 30 is also provided with a pair of sprocket-pinions 32, and is driven by any suitable source of power, as for instance the electric-motor 33 mounted upon the bracket 34 carried upon a lateral extension of one of the legs 18 of said A frame.

Through the lower portion of each of the upwardly extending frames 8 and 9 is journalled a counter-shaft 35, carrying a sprocket-wheel 36, connected by a sprocket-chain 37 with the corresponding sprocket-pinion 32. The counter-shafts 35 are provided upon their adjacent ends with any suitable form of grooved driving-pulleys 38, the grooves of which have cylindrical inner surfaces and directly support the flexible band-knives 39. These knives have their cutting edges facing in the same direction and operate upon opposite sides of the shaft 22, in addition to being sharpened by bevelling their forward edges upon one side only, as shown in Fig. 7, and moving them respectively forwardly and rearwardly of the base of the machine by rotating the hand-wheel 15, so as to bring them more nearly into or out of alignment with each other.

The band-knives 39 are supported at their upper portions by idler grooved pulleys 40, mounted by means of anti-friction bearings 41 upon trunnions 42, each of which is supported by one arm 43 of a rocker member carried by a pivot 44 extending between blocks 45, slidably movable between guides 46 comprising the upper portion of each of the frame members 8 and 9, said guides being spanned at their upper free ends by a cap section 47, through which extends vertically and in threaded engagement therewith a threaded rod 48, having a hand-wheel 49 upon its upper end and surrounded above the cap section with a compression-spring 50. The lower end of this threaded rod, by rotatable engagement with a socket member or bushing 51 carried by a section 52 extending between the blocks 45, serves to raise and lower said blocks at will, and thereby effect the raising and lowering of the rocker member and the pulley 40 carried thereby. Said rocker member also comprises a second arm 53, against which presses a screw 54 in threaded engagement with a threaded bracket 55 extending between and connecting the lower portions of the block 45, said screw being rotated by means of a hand-wheel 56 and maintained in any predetermined position by means of a lock-nut 57 co-operating with the bracket 55.

Keyed to the rear end portion of the shaft 22 are the abutting hubs of wheels 58 and 59, the rims of which wheels are spaced apart as far as may be found necessary to permit the free passage between them of the forward portions of the band-blades 39, while by means of the shaft 13 said blades are separated the maximum distance necessary to accommodate the largest sizes of any given fish which it is desired to handle in this improved machine. At spaced intervals circumferentially of the rims of said wheels 58 and 59 are transversely extending aligned slots 60, dove-tailed in cross-section, and in which are adapted to move blocks 61 parallel with the axis of rotation of said wheels, or, in other words, at right angles with the parallel planes of rotation of said wheels.

Through each of said blocks extends an adjusting screw 62, provided with a polygonally shaped outer end adapted to be engaged by any suitable cam or crank for rotating said screw, while also secured to said screw and movable thereby with respect to said blocks is the base of supporting portion 63 of each of a series of concavously curved frame members 64, preferably provided with spaced apertures 65 and so shaped and positioned in pairs upon said wheels that the frame members of each pair co-operate to form a supporting receptacle, within which fish of many different sizes can be placed and operatively held when being operated upon by the band-knives 39, as the receptacles and fish are carried through an arc by the motion of the wheels 58 and 59 about their common axis and with respect to said band-knives.

It will be noted that the end portions of the receptacle frame members which first approach the knives are larger than the tail-ends of said members, and said forward ends are flared laterally outwardly towards their radially outer extent. Thus while the drawings illustrate a large fish positioned within said receptacles, these receptacles are equally well adapted to contain fish of much less transverse extent, the latter being narrower, the receptacle members are brought closer together by rotating the adjusting screws 60, and the fish also generally assume positions farther towards the tail-end of the receptacles, which are more definitely concaved than are the opposite ends, so that the fish are slightly wedged as it were towards the more closely adjacent tail-ends of the receptacle sections.

In operating the device, the motor 33 is rotated, which as is readily seen from the drawings causes the wheels 58 and 59 (as viewed in Fig. 1) to rotate in a clockwise direction, and the knife-bands 39 pass over the pulleys 38 and 40 also rotating in a clockwise direction (as viewed in Fig. 2). Fish placed as shown in the receptacles, as they ascend at the left-hand side of the device (as viewed in Fig. 1) rise and approach the first band-knife, which enters the head portion of the fish (the head itself preferably having been removed), and by virtue of the bevelling of the knife edge, the blade impinges against and passes to one side of the back-bone of the fish. As each fish continues in its circular path, it encounters the second blade, which also cuts into the fish and impinges against and passes by the opposite side of the bone of said fish, with the result that, as the fish leaves the second knife, it can be withdrawn from the receptacle in three sections, the central section of which containing the bone is discarded temporarily, and the laterally opposite side sections comprising almost solely edible meat may be passed to the trimming-tables. Adjustments of the machine have been hereinbefore to provide for the handling of fish of various sizes and shapes.

Having thus described my invention, what I claim and desire to protect by Letters Patent of the United States is:—

1. The combination of a rotary member, having a plurality of rims supported and rotatably carried thereby, receptacles carried by said rims to support articles to be cut, cutting members extending between said rims and into the path of movement of articles supported by said receptacles, and means to adjust said cutting members with respect to said receptacles and with respect to each other, independently of said rims.

2. The combination of a rotary member, having a plurality of rims supported and rotatably carried thereby, receptacles carried by said rims to support articles to be cut, cutting members extending between said rims and into the path of movement of articles supported by said receptacles, means to adjust said cutting members with respect to said receptacles and with respect to each other, independently of said rims, means to support said cutting members to move within their respective planes, and means to rotate said first-named member and to move said cutting members simultaneously.

3. The combination of a pair of spaced rotary members having flat circumferential rims and movable in parallel planes, members carried by said first members which co-operate to form a receptacle having spaced sides, cutting members extending between said rotary members and into the path of movement of an article carried by said receptacle, and means to adjust said receptacle members parallel with the common axes of rotation of said rotary members to alter the centre of said receptacle with respect to said cutting members, and to adjust them with respect to each other to accommodate articles of different sizes.

4. The combination of a pair of spaced rotary members movable in parallel planes, members carried by said first members which co-operate to form a receptacle having spaced sides, cutting members extending between said rotary members and into the path of movement of an article carried by said receptacle, means to move said cutting members simultaneously with and with respect to said rotary members, and means to shift the planes of movement of said cutting members with respect to each other.

5. The combination of a pair of spaced rotary members movable in parallel planes, members carried by said first members which co-operate to form a receptacle having spaced sides, cutting members extending between said rotary members and into the path of movement of an article carried by said receptacle, means to adjust said receptacle member parallel with the common axes of rotation of said rotary members to alter the centre of said receptacle with respect to said cutting members, and to adjust them with respect to each other to accommodate articles of different sizes, means to move said cutting members simultaneously with and with respect to said rotary members, and means to shift the planes of movement of said cutting members with respect to each other.

6. The combination of a rotary member having a plurality of rims, supporting pulleys, cutting members supported by said pulleys, a base, a pair of standards or frames adapted to carry the said supporting pulleys, and means mounted upon said base cooperating with each of said frames in a manner whereby the said cutting members are shifted towards or away from alignment with a common plane.

7. The combination of a rotary member having a plurality of rims, cutting members, means for tensioning the said cutting members independently of each other, pulleys for supporting the said cutting members, and means for canting the said pulleys whereby the tension of each cutting member is adjusted, and their relationship to each other determined.

In testimony whereof I have affixed my signature.

JAMES J. BARRY.